Feb. 13, 1962   R. C. SEARS   3,020,693
WINDROWING ATTACHMENT FOR ROTARY LAWN MOWERS
Filed Nov. 20, 1959

INVENTOR.
Ralph C. Sears.
BY
Fishburn and Gold
ATTORNEYS.

3,020,693
WINDROWING ATTACHMENT FOR ROTARY LAWN MOWERS
Ralph C. Sears, Rte. 2, Box 93, Salina, Kans.
Filed Nov. 20, 1959, Ser. No. 854,435
2 Claims. (Cl. 56—25.4)

This invention relates to an attachment for lawn mowers, and more particularly to a device for attachment to a rotary lawn mower for windrowing the grass or other vegetation cut by the mower and propelled from the housing of the mower.

In some instances the used of a lawn mower in cutting grass desires to prevent scattering of the cut grass over the lawn after the grass is cut therefrom. It is well known that in many types of lawn mowers the housing for the mower is provided with a discharge opening through which the cut grass or other vegetation is expelled by the rotary force of the blade of the mower and the cut grass will be scattered over the cut portion of the lawn. In some instances it may be desirable to scatter the grass, but oftentimes the scattering of the grass is so heavy that it will mat on the cut portion of the lawn and cause molding, rot and sometimes killing the grass on the lawn.

Even in instances where the cut grass is not heavy and would not damage the lawn it creates an unsightly appearance and it is desirable to rake the lawn to remove the grass therefrom. This is a time consuming task and oftentimes the owner of the lawn is pressed for time. It has, therefore, been found necessary in certain instances to provide means for preventing scattering of the cut grass over the lawn, and certain apparatus have been devised for piling the grass as it leaves the mower, and this piling is known as "windrowing." After the grass has been windrowed it is a relatively simple matter to rake the windrowed grass and pick it up for disposal.

It is the principal object of the present invention to provide an attachment for a rotary mower comprising, a substantially angle-shaped member extending rearwardly and outwardly of the mower housing and having an arm of the same shape attached to the depending skirt of the housing at the front of the mower.

Other objects of the present invention are to provide an attachment for a rotary mower which will gather the grass cuttings and other vegetation and distribute them in a window alongside of the mower as the grass is being cut; to provide a hand attachment to window the grass having a vertical side and a horizontal side provided with an arm having a vertical side for attachment to the front end of the mower and having a horizontal portion of the same contour as the horizontal portion of the deflecting portion of the attachment; to provide the attachment with a horizontal portion which meets the horizontal portion of the arm attaching member adjacent the chute of the housing of the mower whereby the grass as it leaves the chute will contact the vertical side of the attachment and be deflected rearwardly and outwardly to row the grass alongside the mower; to provide the attachment with a vertical side on the attaching arm of substantially the same width as the depth of the skirt on the front end of the mower; to provide the vertical portion of the depending skirt of the deflecting portion of the attachment with a rounded forward lower edge to accommodate for unevenness in the ground over which the mower is propelled; to provide the deflecting portion of the attachment with a slightly sloping or tapered top or horizontal portion downwardly towards the rear end and away from the arm portion of the attachment to facilitate movement of the cut grass therethrough; to provide means for attachment of the arm portion thereof to the depending skirt of the front portoin of the housing of the mower; and to provide a device of this character simple and economical to manufacture.

In accomplishing these and other objects of the invention I have provided improved details of structure, the preferred forms of which are shown in the accompanying drawings, wherein.

Figure 1:
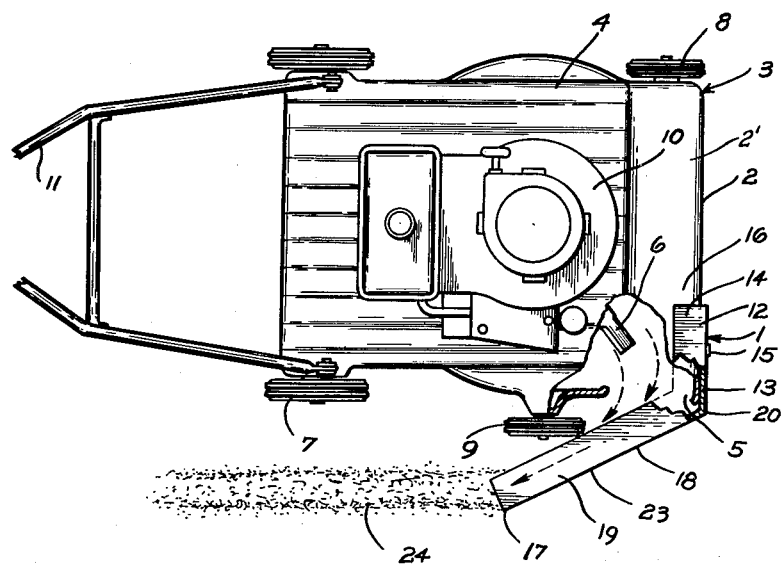
FIG. 1 is a fragmentary partly sectional top plan view of my attachment for lawn mowers shown attached to the mower with parts broken away to better illustrate the invention.

Referring more in detail to the drawings:

1 designates an attachment for windrowing of grass embodying the features of my invention shown attached to the depending skirt 2 of the forward end 2' of a lawn mower 3 having a housing 4 and a discharge opening or chute 5 at the forward righthand corner 5' of the housing through which the cut grass is propelled due to high-speed rotation of the blade 6 of the mower. The opening 5 is generally in a line tangential to the circle defining the path of the cuctting portion of the blade and may be an inverted channel opening from the inverted pan shape of the housing commonly used in rotary type mowers. I have here illustrated a mower having the housing 4 supported on rear wheels 7 and front wheels 8 and 9. In the illustrated structure the front wheel 8 is at the left forward corner 8' of the housing and the other front wheel 9 is located at the right side of the housing immediately to the rear of the opening 5 and extends slightly outward from the housing and laterally outwardly of the rear wheel 7, as best illustrated in FIG. 1. The mower is powered by the usual motor 10 and has a handle 11 for guiding as is the usual practice.

The windrowing attachment 1 includes an arm 12 of substantially angle shape with a vertical portion 13 and a horizontal portion 14. The vertical portion engages the depending skirt 2 of the housing 3 of the mower and is secured thereto by bolts or the like 15. The horizontal portion 14 extends over the top edge 16 of the housing of the skirt, as best illustrated in FIG. 1.

Figure 2:
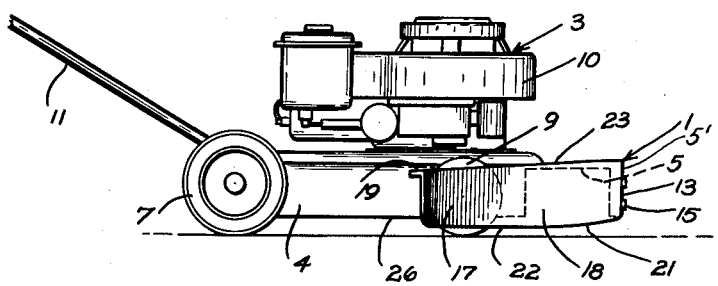
FIG. 2 is a fragmentary side view of the attachment showing the chute of the housing of the mower in dotted lines.
Figure 3:
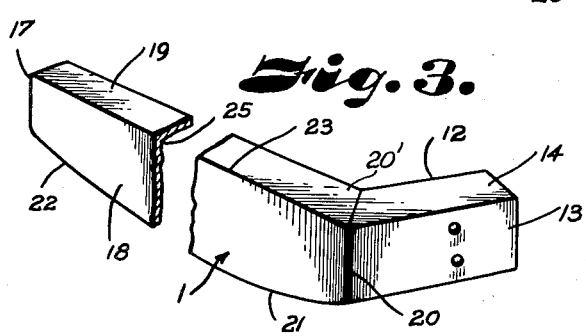
FIG. 3 is an enlarged perspective view of the attachment for windrowing the grass detached from the mower with parts broken away to illustrate the section therethrough.

Formed integrally with the arm 12 of the attachment is a grass deflecting member 17 having a vertical skirt or side portion 18 and a horizontal portion 19 joined to the arm 12 by welding 20 or other suitable means to form a one-piece structure. The lower edge of the vertical or skirt portion 18 slopes downwardly from the juncture 20 thereof with the arm 12, as indicated at 21, and then runs parallel with the ground, as indicated at 22. The upper edge 23 of the vertical portion slopes downwardly and rearwardly, also as best illustrated in FIG. 2, so that the grass will be deflected slightly downwardly from the horizontal portion 19 as it moves rearwardly along the deflector to windrow the cut grass and other vegetation as it is propelled from the opening 5 as indicated at 24 (FIG. 1).

The deflecting member 17 of the attachment extends outwardly and rearwardly of the forward corner 5' of the housing of the mower and outwardly of the wheel 9, as best illustrated in FIG. 1, so that the windrowing will be outside the wheels and the wheels will not contact the windrow after the grass has been cut and windrowed. The forward portion 20' of the horizontal member 19 of the deflecting member 17 is closely adjacent the opening 5, as shown in FIG. 1, and the joinder of the horizontal portion 19 with the horizontal portion 14 of the arm is closely adjacent to the discharge opening 5 so that the grass as it leaves the chute will not be thrown over the deflector but will contact the depending side or skirt 18 and be deflected backwardly through the angle-shaped passageway 25 of the deflector portion 17 of the attachment 1.

It will be obvious from the foregoing that I have provided an improved windrowing attachment simple and economical to manufacture. It will further be obvious that the sloping forward portion 21 of the skirt member 18 will provide for unevenness of the ground or terrain over which the mower is used, and the straight lower edge portion 22, while not contacting the ground, is slightly lower than the lower edge 26 of the housing so that the deflector will engage in the grass and will thereby prevent the cut grass from being thrown under the lower edge of the deflector. Generally the blade 6 of the mower is slightly above the lower edge 26 of the housing so that there is no danger of coming in contact with the blade by the operator.

It will further be obvious that my attachment will facilitate in preventing rocks or other debris being thrown outwardly from the opening 5, and thus lessen the danger of injury to anyone using the mower or adjacent thereto while the mower is being used, as the deflector will deflect such debris backwardly as it leaves the discharge opening.

What I claim and desire to secure by Letters Patent is:

1. A windrowing attachment for a mobile mower for cutting grass or the like having a housing with a top and depending skirt forming sides and a forward end having a substantially straight portion and corners at said forward sides and having a horizontal rotary cutting blade under the housing, one of said sides having an opening therein near said forward end of the housing, said windrowing attachment comprising, an angle member having vertical and horizontal legs, means attaching said vertical leg to the substantially straight portion of said depending skirt at the forward end near one corner thereof, the horizontal leg having a portion extending over the top of a portion of the housing, said angle member including an elongated extension portion extending outwardly and rearwardly at an angle from said front side of the housing over said opening in the side of said housing for deflecting the grass as it is propelled through said opening by rotation of the blade, the lower edge of said vertical leg of said extension extending below said depending skirt and being curved to accommodate for unevenness in the ground and said horizontal leg of the angle member and extension being on substantially the same plane as said top of the housing.

2. A windrowing attachment for a mobile mower for cutting grass or the like having a housing with a top and depending skirt forming sides and a forward end having a substantially straight portion and corners at said forward side and having a horizontal rotary cutting blade under the housing, one of said sides having an opening therein near said forward end of the housing, said windrowing attachment comprising, an angle member having vertical and horizontal legs, means attaching said vertical leg to the substantially straight portion of said depending skirt at the forward end near one corner thereof, the horizontal leg having a portion extending over the top of a portion of the housing, said angle member including an elongated extension portion extending outwardly and rearwardly at an angle from said front side of the housing to substantially midway longitudinally of said housing and over said opening in the side of said housing for deflecting the grass as it is propelled through said opening by rotation of the blade, the lower edge of said vertical leg of said extension extending below said depending skirt and being curved to accommodate for unevenness in the ground and said horizontal leg of the angle member and extension being on substantially the same plane as said top of the housing, the grass from said blade being discharged at a substantially 90° angle to the direction of travel of said mower.

References Cited in the file of this patent
UNITED STATES PATENTS

| | | |
|---|---|---|
| 2,489,059 | Surgi | Nov. 22, 1949 |
| 2,495,032 | Stuhl | Jan. 17, 1950 |
| 2,708,334 | Covers | May 17, 1955 |
| 2,756,556 | Watkins | July 31, 1956 |